(12) United States Patent
Lindblom (10) Patent No.: US 10,407,009 B2
(45) Date of Patent: Sep. 10, 2019

(54) BUMPER BEAM

(71) Applicant: Gestamp Hardtech AB, Lulea (SE)

(72) Inventor: Alexander Lindblom, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 15/757,039

(22) PCT Filed: Sep. 7, 2016

(86) PCT No.: PCT/SE2016/050838
§ 371 (c)(1),
(2) Date: Mar. 2, 2018

(87) PCT Pub. No.: WO2017/044035
PCT Pub. Date: Mar. 16, 2017

(65) Prior Publication Data
US 2018/0281710 A1    Oct. 4, 2018

(30) Foreign Application Priority Data

Sep. 7, 2015 (SE) ..................... 1551140

(51) Int. Cl.
*B60R 19/12* (2006.01)
*B60R 19/44* (2006.01)
(Continued)

(52) U.S. Cl.
CPC .............. *B60R 19/12* (2013.01); *B60R 19/18* (2013.01); *B60R 19/44* (2013.01); *B60R 19/023* (2013.01);
(Continued)

(58) Field of Classification Search
CPC ......... B60R 19/04; B60R 19/18; B60R 19/44; B60R 19/023; B60R 2019/1806; B60R 19/12
(Continued)

(56) References Cited

U.S. PATENT DOCUMENTS

| | | | |
|---|---|---|---|
| 6,354,641 B1 * | 3/2002 | Schroeder | B60R 19/18 293/122 |
| 7,100,952 B2 * | 9/2006 | Reierson | B60R 19/18 293/102 |

(Continued)

FOREIGN PATENT DOCUMENTS

| | | |
|---|---|---|
| JP | 2004262300 | 9/2004 |
| KR | 20090058855 | 6/2009 |
| KR | 20100024764 | 3/2010 |

*Primary Examiner* — Dennis H Pedder
(74) *Attorney, Agent, or Firm* — Mark P. Stone (57) ABSTRACT

The invention relates to a bumper beam (B) comprising a main cross member (1) and a cross member part (2) fixedly attached to said main cross member (1). Said cross member part (2) forms in itself or together with one or more portions of the main cross member (1) a closed chamber (C) in a cross section of the bumper beam and is arranged at an upper side (11) or at a lower side (12) of said main cross member (1). Said closed chamber (C) abuts and extends over only a portion of said upper side (11) or said lower side (12) of said main cross member (1) as seen in the cross direction of said main cross member (1) and over essentially the entire length and in a longitudinal direction of said main cross member (1). Said main cross member (1) together with said cross member part (2) form a closed main chamber (M).

20 Claims, 10 Drawing Sheets

(51) Int. Cl.
*B60R 19/18* (2006.01)
*B60R 19/02* (2006.01)
*B60R 19/34* (2006.01)

(52) U.S. Cl.
CPC ....... *B60R 19/34* (2013.01); *B60R 2019/1806* (2013.01); *B60R 2019/1826* (2013.01)

(58) Field of Classification Search
USPC .......................... 293/102, 142–144, 147, 155
See application file for complete search history.

(56) References Cited

U.S. PATENT DOCUMENTS

| | | | |
|---|---|---|---|
| 7,533,912 B2 * | 5/2009 | Frederick | B60R 19/18 293/120 |
| 2006/0028032 A1 | 2/2006 | Henseleit | |
| 2015/0115572 A1 | 4/2015 | Kim et al. | |

* cited by examiner

BUMPER BEAM

FIELD OF THE INVENTION

The invention relates to a bumper beam according to the preamble of claim 1.

BACKGROUND OF THE INVENTION

It is known to produce bumper beams comprising two or more parts, see WO 2014/142733, for instance, which discloses a bumper beam having a hat-shaped profile with a cover.

When producing cars, for instance, with the same body in white but having different wheel suspensions, the bumper beams will be located at different heights depending upon the car model. It would thus be economically advantageously to produce a bumper beam having a main body/main cross member which is extendable either upwardly or downwardly or both so as to cope vertically offset impacts. It is also important that the bumper beam provides a good solution in case of vertically offset impacts.

OBJECT OF THE INVENTION

An object of the invention is to achieve a bumper beam having at least two closed chambers and so formed that it provides a good solution in case of vertically offset impacts.

A further object is to achieve a bumper beam having at least two closed chambers and with reduce weight, but yet increased stiffness.

Yet a further object is to provide better interface between crash boxes and a bumper beam compared to a common roll formed profile.

BRIEF DESCRIPTION OF THE INVENTION

According to the invention these objects are achieved by a bumper beam comprising a main cross member and a cross member part fixedly attached to said main cross member, wherein said cross member part forms in itself or together with one or more portions of the main cross member a closed chamber in a cross section of the bumper beam, arranged at an upper side or at a lower side of said main cross member, characterized in that said closed chamber abuts and extends over only a portion of said upper side or said lower side of said main cross member as seen in the cross direction of said main cross member and over essentially the entire length and in a longitudinal direction of said main cross member, and that said main cross member together with said cross member part form a closed main chamber.

Preferred embodiments are defined in the dependent claims.

BRIEF DESCRIPTION OF THE DRAWINGS

The invention is described in more detail below with reference being made to non-limiting examples shown on the appended drawings, in which.

DESCRIPTION OF PREFERRED EMBODIMENTS

In the below descriptions and claims the inventive bumper beam is described in relation to a front bumper beam. Therefore, expressions such as front side, back side, rearwardly etc. should be read in connection with a front bumper beam but not limited to a front bumper beam.

Figure 1:
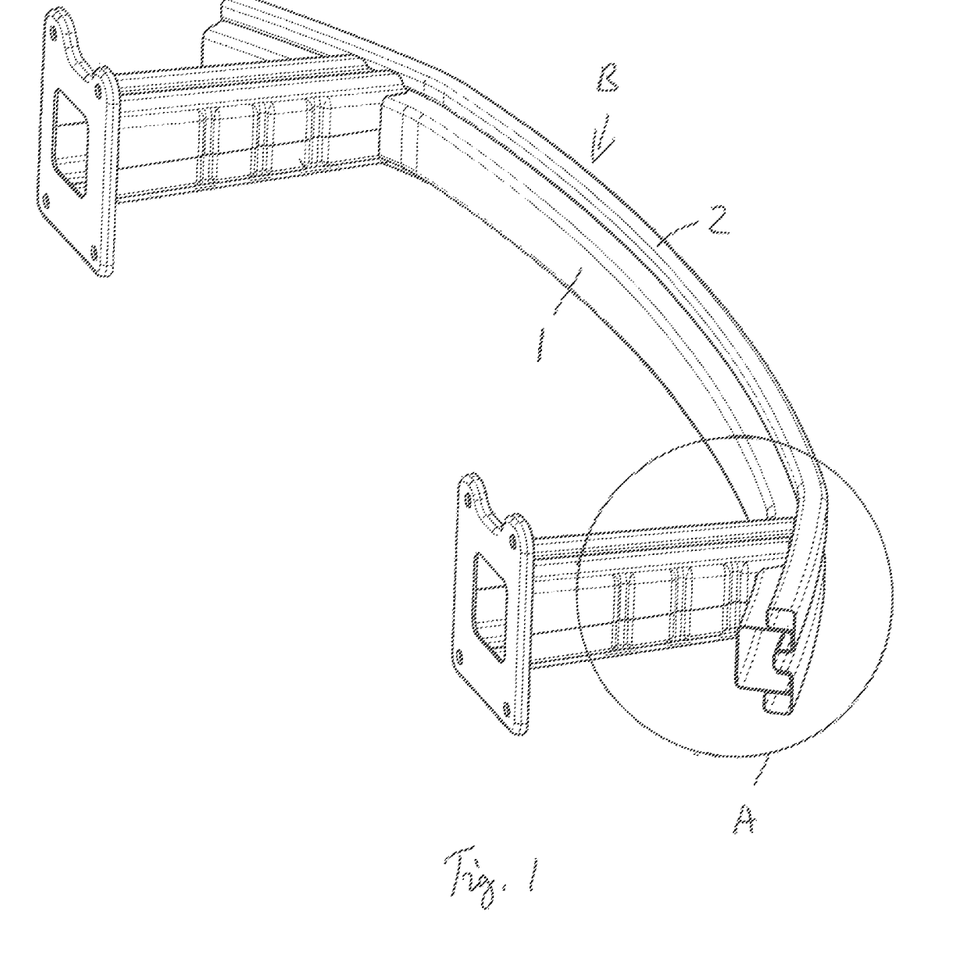
FIG. 1 is a perspective view obliquely from above of a bumper beam with crash boxes.

As seen in FIG. 1 a bumper beam B consists of at least two parts, one main cross member 1 and one cross member part 2. The main cross member 1 could either be roll-formed, cold-formed or hot-formed depending on its design. Said at least one cross member part 2 must most likely be roll-formed. In a preferred embodiment both the main cross member 1 and the cross member part 2 is made of steel, but it should be noted that the main cross member and/or the cross member part could be made of any other suitable material.

Figure 2:
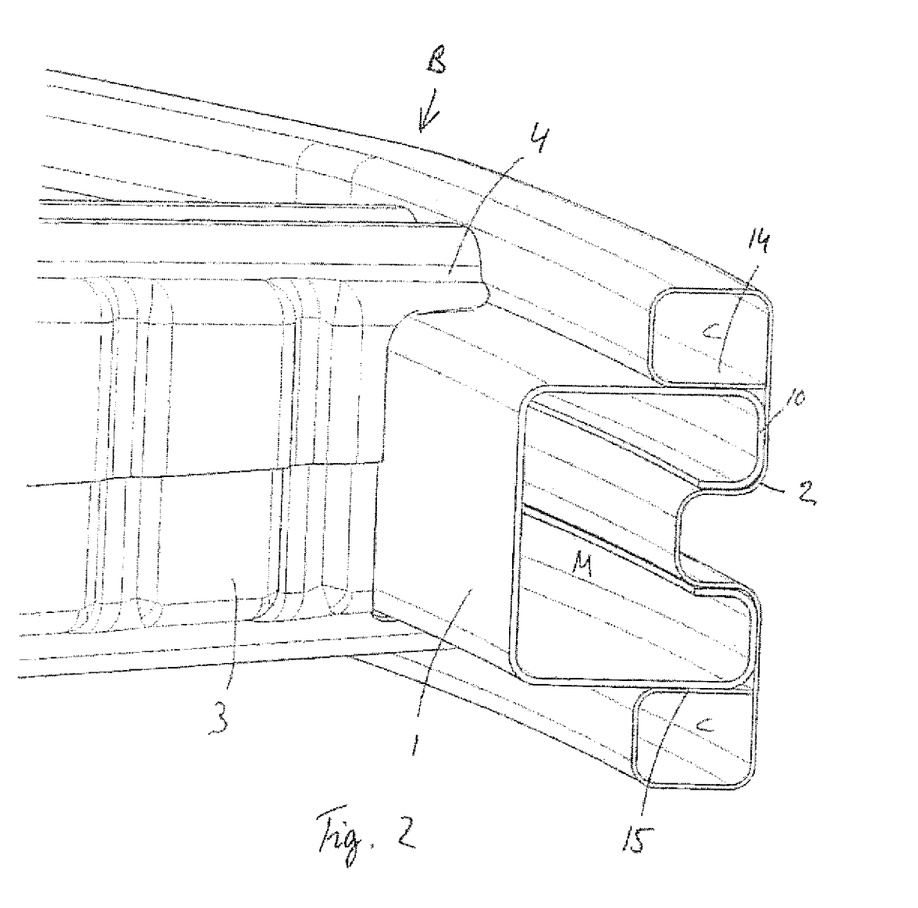
FIG. 2 is an enlarged view of the encircled portion A in FIG. 1.

Moreover, as seen in FIG. 2, each crash box 3 is preferably only attached to the main cross member 1, but not limited to such an attachment, provided with a cross member part 2 having a symmetrical profile in cross section in the shown embodiment not forming part of the invention, and in a preferred embodiment an end 4 of said crash box 3 attached to the main cross member 1 has a shape complementary to the shape of the profile forming said main cross member 1. Preferably, the end 4 is a forked end which surrounds a major portion of three sides of the main cross member 1. By forming the end 4 in this way a larger attachment surface is formed, thus increasing the attachment strength between the crash box and the bumper beam, particularly in cases of collisions being not perpendicular to the bumper beam and vertically offset impacts.

In its most generic form, the inventive bumper beam B, comprises a main cross member 1 and a cross member part 2 attached to said main cross member 1. Said cross member part 2 forms together with one or more portions of the main cross member 1 a closed main chamber M and at least one closed chamber C, arranged at an upper side 11 or at a lower side 12 of said main cross member 1. Said cross member part 2 is arranged at a front surface 10 of said main cross member 1 and towards the same. In an embodiment not show said cross member part 2 may be arranged at a back surface of said main cross member 1 towards the front surface 10.

Figure 3:
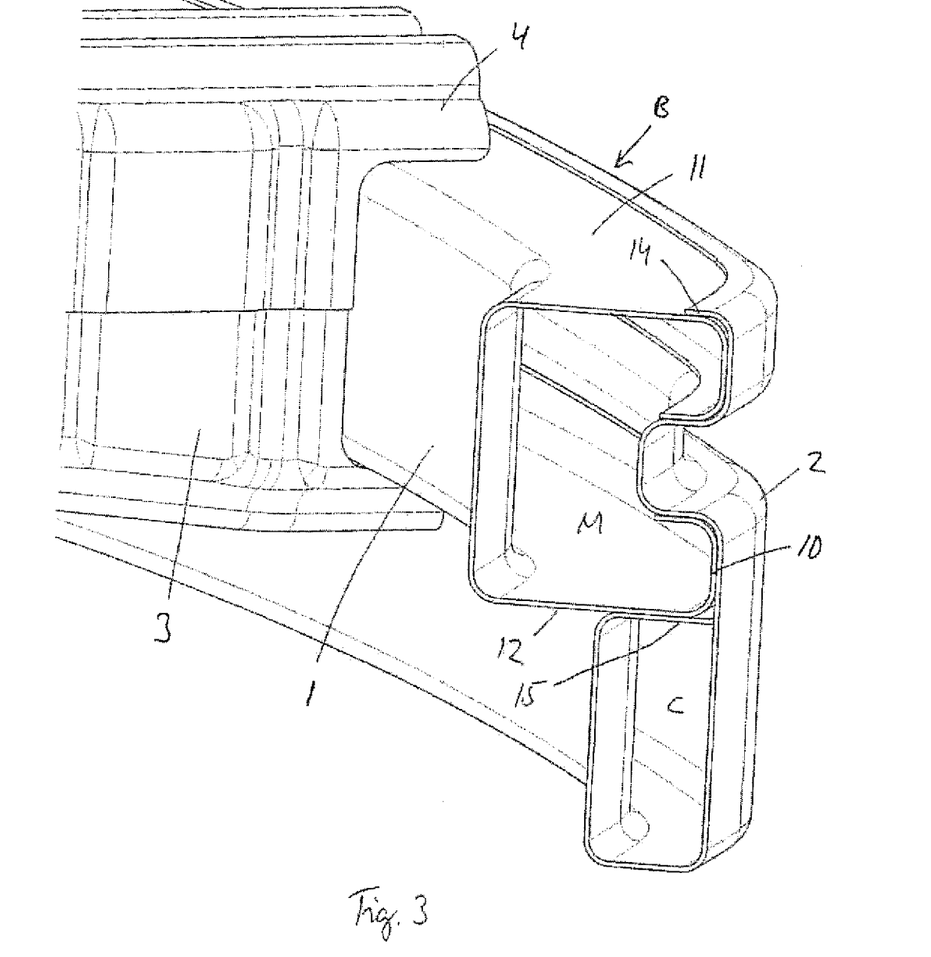
FIG. 3 is an enlarged view of a crash box attached to the inventive bumper beam.
Figure 4:
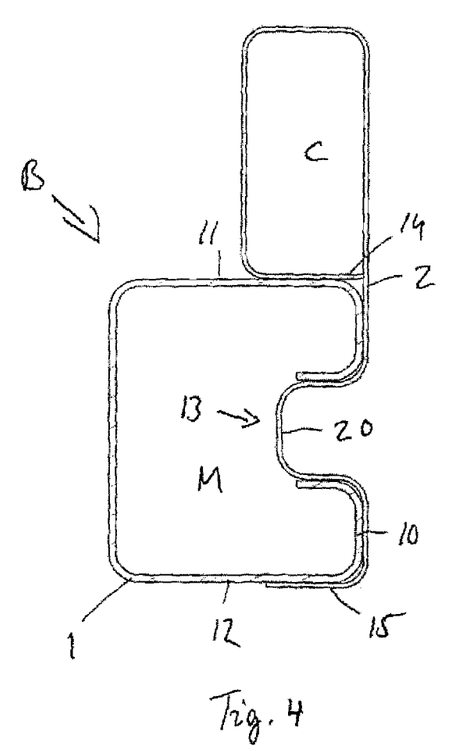
FIGS. 4 to 10 show different embodiments in cross section of the inventive bumper beam.
Figure 5:
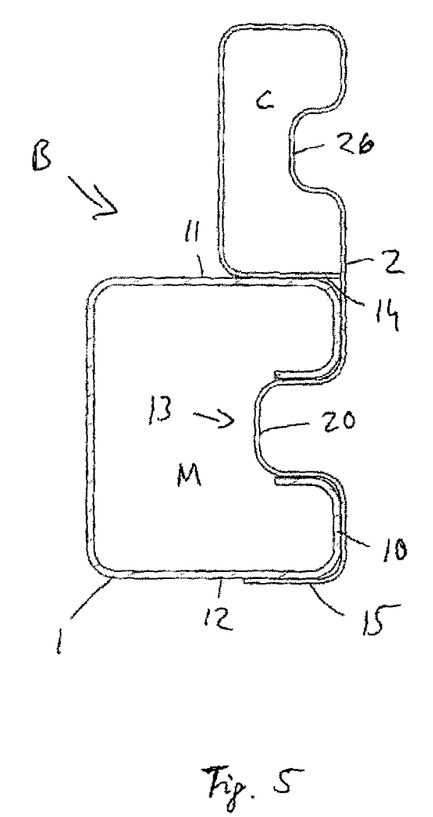
Figure 6:
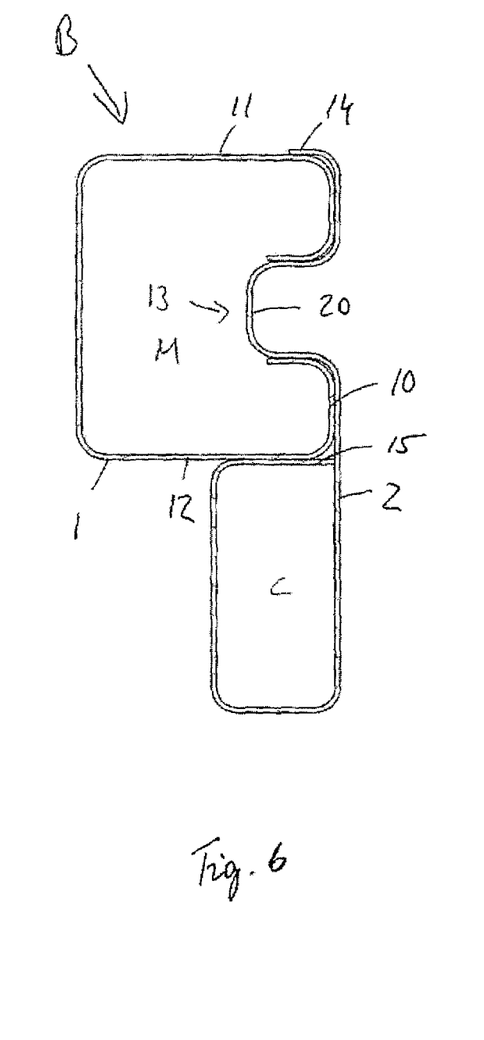

FIG. 3 illustrates a bumper beam B according to the invention with the crash box 3 attached the main cross member 1 provided with the cross member part 2 having an unsymmetrical profile in cross section.

Thus, the inventive bumper beam B will form a bumper beam having at least two closed chamber, i.e. a closed main chamber M and a closed chamber C. Said bumper beam is preferably made of steel but not limited to steel.

More particularly, in the embodiments of the inventive bumper beam B shown in FIGS. 3 to 10, said least one cross member part 2 is formed in one piece and totally covers said front surface 10 of the main cross member 1 both in the horizontal and the vertical direction.

In FIGS. 3 to 10 the main cross member 1 forms together with one or more portions of the cross member part 2 a closed main chamber M separate from the at least one closed chamber C formed by the cross member part 2.

In the embodiments of the inventive bumper beam B shown in FIGS. 3-7 the cross member part 2 is provided with a longitudinal depression 20 directed towards the main cross member 1, and the main cross member 1 is provided with a corresponding longitudinal open channel or void 13.

Figure 8:
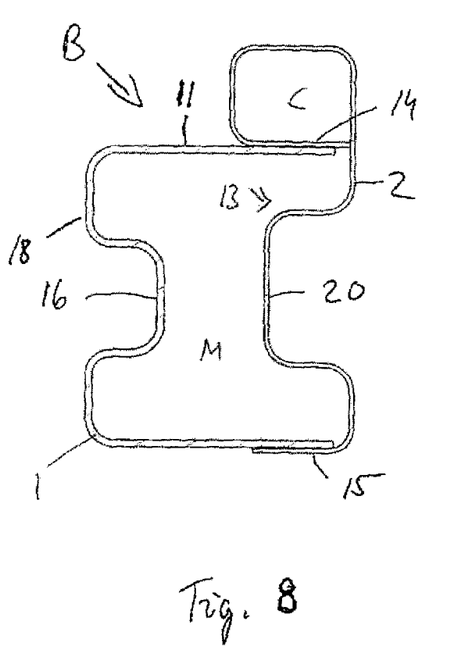
Figure 9:
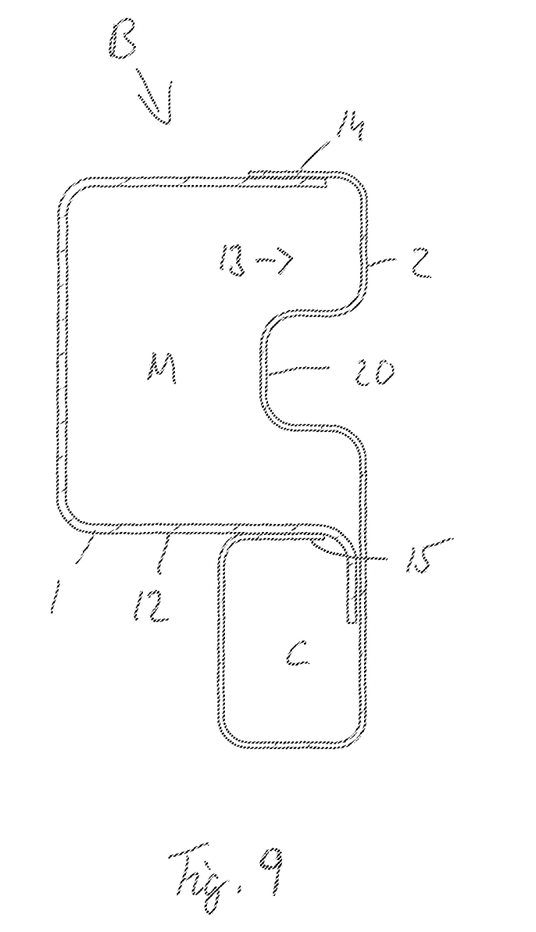
Figure 10:
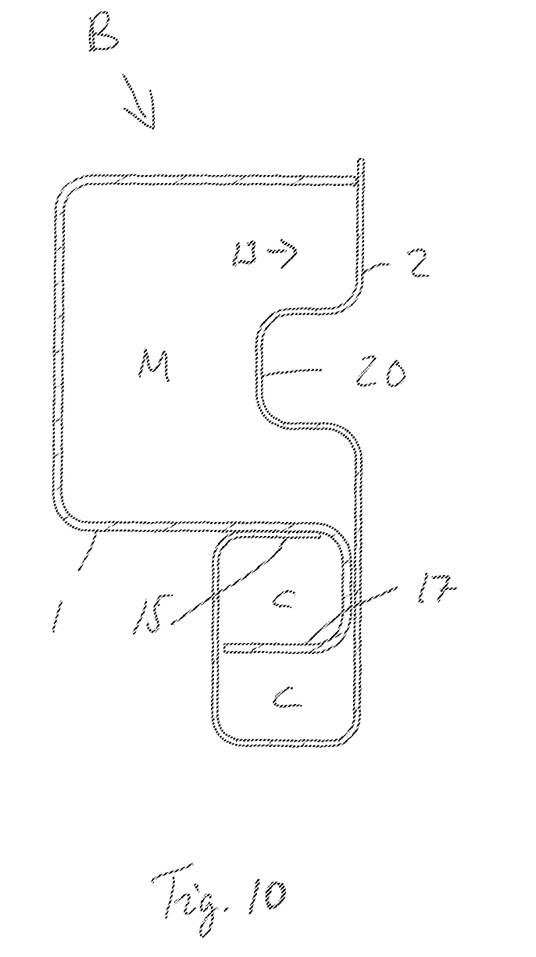

In the embodiments of the inventive bumper beam B shown in FIGS. 8-10 the cross member part 2 is provided with a longitudinal depression 20 directed towards the main cross member 1, and the main cross member 1 is provided with a longitudinal open channel or void 13 extending over the entire height of said main cross member 1.

As seen in the figures, said closed chamber C abuts and extends over only a portion of the width of said upper side 11 or said lower side 12 of said main cross member 1 as seen in the cross direction of said main cross member 1 and over essentially the entire length and in the longitudinal direction of said main cross member 1, i.e. at least between the crash boxes 3.

Said portion of the closed chamber C which abuts and extends over said upper side 11 or said lower side 12 of said main cross member 1 amounts to 20% to 80%, preferably 40% to 60%, and most preferably to about 50%, of the width of the main cross member 1.

In the embodiments of the inventive bumper beam B shown FIGS. 3-7, the main cross member 1 has the same shape, a type of square C-profile, and is provided with a cross member part 2 having different profile as seen in cross section. In FIGS. 3-6 the cross member part 2 forms in itself one closed chamber C at either the upper side 11 or the lower side 12 of the main cross member 1.

Furthermore, in the above-mentioned embodiments the cross member part 2 comprises a pair of tongues 14, 15 for attaching said cross member part 2 to the upper side 11 or the lower side 12 of the main cross member 1, and that said pair of tongues 14, 15 extend towards or away from a vertical surface of said cross member part 2. Preferably, the tongue 14, 15 forming part of the chamber C extends towards a vertical surface of said cross member part 2.

Figure 7:
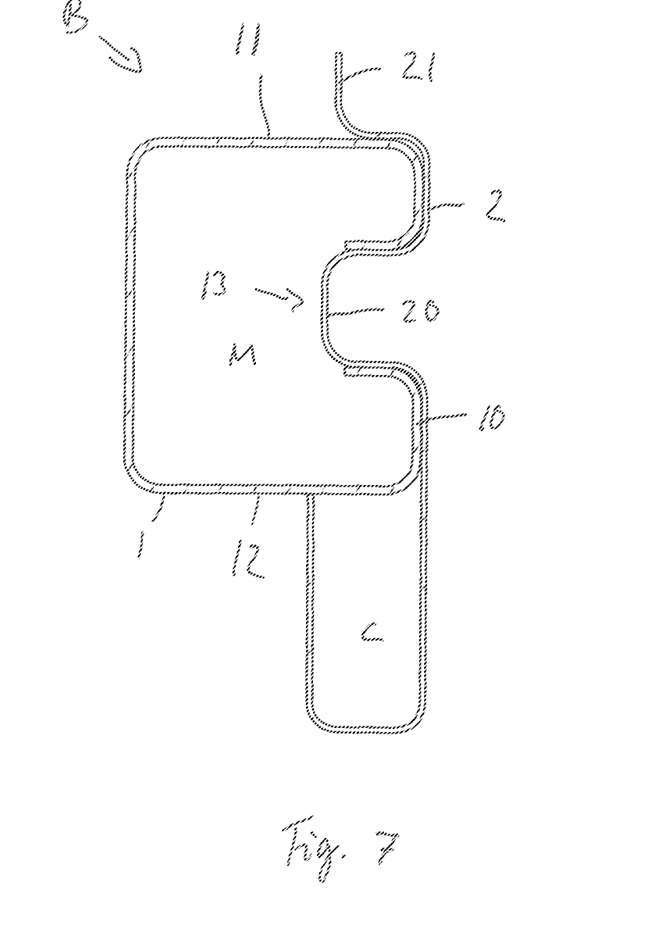

In the embodiment of the inventive bumper beam B shown in FIG. 7, an upper portion of said cross member part 2 is provided with a vertical protruding tongue 21 extending above the upper side 11 of said main cross member 1, and the chamber C is not provided with said tongue 14, 15. Instead an end said cross member part 2 abuts the lower side 12 so as to form the chamber C.

In the embodiment shown in FIG. 8 the main cross member 1 is provided with a longitudinal depression 16 at a backside 18 of said main cross member, and the longitudinal open channel or void 13 extends over the entire height of said main cross member 1. The chamber C is placed on the upper side 11 of the main cross member 1.

In the embodiment shown in FIG. 9, the longitudinal open channel or void 13 extends over the entire height of said main cross member 1 and the chamber C is placed on the lower side 12 of the main cross member 1.

In the embodiment shown in FIG. 10, the longitudinal open channel or void 13 extends over the entire height of said main cross member 1, and two chambers C are arranged, one of which is formed by extending and forming a tongue 17, formed at an extended end of the main cross member 1, in a suitable way inside the chamber C shown in FIG. 9.

In a preferred embodiment, the closed chamber C has rectangular form as seen in cross section.

Moreover, the closed chamber (C) is preferably provided with at least one longitudinal horizontal depression 26.

In all of the above-described embodiments of the inventive bumper beam B, the cross member part 2 is attached to the main cross member 1 by suitable means, and said cross member part 2 is formed in one piece and totally covering the front surface 10 of the main cross member 1 both in the horizontal and the vertical direction.

In several of the embodiments the cross member part 2 comprises a pair of tongues 14, 15 cooperating with the main cross member 1 for attaching the cross member part 2 to the main cross member 1.

The various depressions serve to reinforce the bumper beam B and to improve its deformation behaviour during various collision loads which may be experienced.

To produce a bumper beam according to the invention has i.a. the following benefits:

i) The possibility to design a cross member of steel or any other suitable material with one or more closed chambers.
ii) Weight savings.
iii) A cross member having at least one closed chamber is a good solution when vertically offset impacts occur.
iv) Reduces the force in Z-direction, i.e. in the direction towards/away from the ground, in cases of vertically offset impacts.
v) Reduces the displacement in Z-direction in cases of vertically offset impacts, thus the risk for override/underride is reduced.
vi) Better interface between crash boxes and cross member compared to a common roll formed profile.
vii) Reduced number of parts of the interface if compared to a roll formed alternative with plates/brackets between the crash boxes and the cross member.
vii) Possibility to use a main cross member for all markets and design a unique cross member part/cover for each market adapted to local requirements.
viii) The main cross member can either be roll-formed or hot-formed/cold-formed.

The invention claimed is:

1. A bumper beam (B) comprising a main cross member (1) and a cross member part (2) fixedly attached to said main cross member (1), wherein said cross member part (2) forms in itself or together with one or more portions of the main cross member (1) a closed chamber (C) in a cross section of the bumper beam, arranged at an upper side (11) or at a lower side (12), or both, of said main cross member (1), wherein said closed chamber (C) abuts and extends over only a portion of said upper side (11) or said lower side (12) of said main cross member (1) as seen in the cross direction of said main cross member (1) and over essentially the entire length and in a longitudinal direction of said main cross member (1), and that said main cross member (1) together with said cross member part (2) form a closed main chamber (M).

2. The bumper beam (B) according to claim 1, wherein said closed chamber (C) is arranged proximate to a front surface (10) of said main cross member (1) and directed rearwardly.

3. The bumper beam (B) according to claim 2, wherein said cross member part (2) is formed in one piece and totally covering the front surface (10) of the main cross member (1) both in horizontal and vertical direction.

4. The bumper beam (B) according to claim 1, wherein said cross member part (2) is provided with at least one longitudinal depression (20) directed towards the main cross member (1), and that said main cross member (1) is provided with at least one corresponding longitudinal open channel or void (13).

5. The bumper beam (B) according to claim 1, wherein said cross member part (2) comprises a pair of tongues (14, 15), one of said tongues (14) attaching said cross member part (2) to the upper side (11) of the main cross member (1), another of said tongues (15) attaching said cross member part (2) to the lower side (12) of the main cross member (1), and that each of said tongues (14, 15) abuts against a vertical surface of said cross member part (2).

6. The bumper beam (B) according to claim 1, wherein said closed chamber (C) is provided with at least one longitudinal horizontal depression (26).

7. The bumper beam (B) according to claim 1, wherein, when said closed chamber (C) is arranged at the lower side (12) of said main cross member (1), an upper portion of said least one cross member part (2) is provided with a vertical protruding tongue (21) extending above the upper side (11) of said main cross member (1).

8. The bumper beam (B) according to claim 1, wherein said closed chamber (C) has rectangular form as seen in cross section.

9. The bumper beam (B) according to claim 1, wherein said main cross member (1) is either roll-formed, cold-formed or hot-formed, and that said at least one cross member part (2) is roll-formed.

10. The bumper beam (B) according to claim 2, wherein said cross member part (2) is provided with at least one longitudinal depression (20) directed towards the main cross member (1), and that said main cross member (1) is provided with at least one corresponding longitudinal open channel or void (13).

11. The bumper beam (B) according to claim 3, wherein said cross member part (2) is provided with at least one longitudinal depression (20) directed towards the main cross member (1), and that said main cross member (1) is provided with at least one corresponding longitudinal open channel or void (13).

12. The bumper beam (B) according to claim 2, wherein said cross member part (2) comprises a pair of tongues (14, 15), one of said tongues (14) attaching said cross member part (2) to the upper side (11) of the main cross member (1), another of said tongues (15) attaching said cross member part (2) to the lower side (12) of the main cross member (1), and that each of said tongues (14, 15) abuts against a vertical surface of said cross member part (2).

13. The bumper beam (B) according to claim 3, wherein said cross member part (2) comprises a pair of tongues (14, 15), one of said tongues (14) attaching said cross member part (2) to the upper side (11) of the main cross member (1), another of said tongues (15) attaching said cross member part (2) to the lower side (12) of the main cross member (1), and that each of said tongues (14,15) abuts against a vertical surface of said cross member part (2).

14. The bumper beam (B) according to claim 4, wherein said cross member part (2) comprises a pair of tongues (14, 15), one of said tongues (14) attaching said cross member part (2) to the upper side (11) of the main cross member (1), another of said tongues (15) attaching said cross member part (2) to the lower side (12) of the main cross member (1), and that each of said tongues (14, 15) abuts against a vertical surface of said cross member part (2).

15. The bumper beam (B) according to claim 2, wherein said closed chamber (C) is provided with at least one longitudinal horizontal depression (26).

16. The bumper beam (B) according to claim 3, wherein said closed chamber (C) is provided with at least one longitudinal horizontal depression (26).

17. The bumper beam (B) according to claim 2, wherein said closed chamber (C) has rectangular form as seen in cross section.

18. A bumper beam (B) comprising a main cross member (1) and a cross member part (2) fixedly attached to said main cross member (1), wherein said cross member part (2) forms in itself or together with one or more portions of the main cross member (1) a closed chamber (C) in a cross section of the bumper beam, arranged at an upper side (11) or at a lower side (12) of said main cross member (1), wherein said closed chamber (C) abuts and extends over only a portion of said upper side (11) or said lower side (12) of said main cross member (1) as seen in the cross direction of said main cross member (1) and over essentially the entire length and in a longitudinal direction of said main cross member (1), and that said main cross member (1) together with said cross member part (2) form a closed main chamber (M), wherein said closed chamber (C) is arranged proximate to a front surface (10) of said main cross member (1) and directed rearwardly, wherein said cross member part (2) is formed in one piece and totally covering the front surface (10) of the main cross member (1) both in horizontal and vertical direction, and wherein said closed chamber (C) has rectangular form as seen in cross section.

19. The bumper beam (B) according to claim 2, wherein said main cross member (1) is either roll-formed, cold-formed or hot-formed, and that said at least one cross member part (2) is roll-formed.

20. The bumper beam (B) according to claim 3, wherein said main cross member (1) is either roll-formed, cold-formed or hot-formed, and that said at least one cross member part (2) is roll-formed.

* * * * *